(12) United States Patent
Boucké

(10) Patent No.: US 11,352,799 B2
(45) Date of Patent: Jun. 7, 2022

(54) GLUE-DOWN DECORATIVE FLOOR COVERING SYSTEM

(71) Applicant: I4F Licensing NV, Hamont-Achel (BE)

(72) Inventor: Eddy Alberic Boucké, Menen (BE)

(73) Assignee: I4F Licensing NV, Hamont-Achel (BE)

( * ) Notice: Subject to any disclaimer, the term of this patent is extended or adjusted under 35 U.S.C. 154(b) by 33 days.

(21) Appl. No.: 16/869,711

(22) Filed: May 8, 2020

(65) Prior Publication Data

US 2021/0214952 A1 Jul. 15, 2021

(30) Foreign Application Priority Data

Jan. 9, 2020 (NL) ...................................... 2024630

(51) Int. Cl.
| | | |
|---|---|---|
| *E04B 2/00* | (2006.01) | |
| *E04F 15/02* | (2006.01) | |
| *B32B 3/06* | (2006.01) | |
| *B32B 7/12* | (2006.01) | |
| *B32B 27/08* | (2006.01) | |
| *B32B 27/30* | (2006.01) | |
| *E04F 15/10* | (2006.01) | |

(52) U.S. Cl.
CPC .......... *E04F 15/02038* (2013.01); *B32B 3/06* (2013.01); *B32B 7/12* (2013.01); *B32B 27/08* (2013.01); *B32B 27/304* (2013.01); *E04F 15/02155* (2013.01); *E04F 15/105* (2013.01); *B32B 2255/10* (2013.01); *B32B 2419/04* (2013.01); *E04F 2201/0161* (2013.01); *E04F 2201/04* (2013.01)

(58) Field of Classification Search
CPC .......... E04F 15/02033; E04F 15/02038; E04F 15/107; E04F 15/102; E04F 2201/042; E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138
USPC .. 52/592.1, 592.3, 592.2, 578, 588.1, 309.1, 52/309.3
See application file for complete search history.

(56) References Cited

U.S. PATENT DOCUMENTS

| | | | |
|---|---|---|---|
| 8,495,848 B2 * | 7/2013 | Pervan | B44C 5/0492 52/591.1 |
| 8,728,603 B2 * | 5/2014 | Windmoller | B32B 27/12 428/60 |
| 8,833,028 B2 * | 9/2014 | Whispell | B32B 3/06 52/588.1 |
| 9,206,611 B2 * | 12/2015 | Vermeulen | E04F 15/02038 |
| 10,519,676 B2 * | 12/2019 | Pervan | E04F 15/107 |

(Continued)

FOREIGN PATENT DOCUMENTS

| | | |
|---|---|---|
| EP | 2642044 A2 | 9/2013 |
| EP | 3245353 | 7/2016 |

(Continued)

*Primary Examiner* — Chi Q Nguyen
(74) *Attorney, Agent, or Firm* — The Webb Law Firm

(57) ABSTRACT

The invention relates to a glue-down decorative floor covering system. The invention also relates to a glue-down floor covering realized by a plurality of tiles of the glue-down floor covering system according to the invention. The invention further relates to a tile for use in a glue-down floor covering system according to the invention.

32 Claims, 5 Drawing Sheets

(56) References Cited

U.S. PATENT DOCUMENTS

| | | | | |
|---|---|---|---|---|
| 2004/0128934 A1* | 7/2004 | Hecht | .................... | E04F 15/02 |
| | | | | 52/578 |
| 2007/0175156 A1* | 8/2007 | Pervan | .................... | B44C 3/123 |
| | | | | 52/582.1 |
| 2010/0281803 A1* | 11/2010 | Cappelle | ............... | E04F 15/045 |
| | | | | 52/309.1 |
| 2011/0167744 A1* | 7/2011 | Whispell | ................. | B32B 5/245 |
| | | | | 52/309.1 |
| 2011/0271632 A1* | 11/2011 | Cappelle | ............... | F16B 5/0056 |
| | | | | 52/582.2 |
| 2020/0123788 A1* | 4/2020 | Baert | ...................... | B32B 27/08 |
| 2020/0131784 A1* | 4/2020 | Boucke | ............ | E04F 15/02038 |
| 2020/0308846 A1* | 10/2020 | Josefsson | .......... | E04F 15/02033 |

FOREIGN PATENT DOCUMENTS

| WO | 2004018797 A1 | 3/2004 |
|---|---|---|
| WO | 2016113721 A1 | 7/2016 |

\* cited by examiner

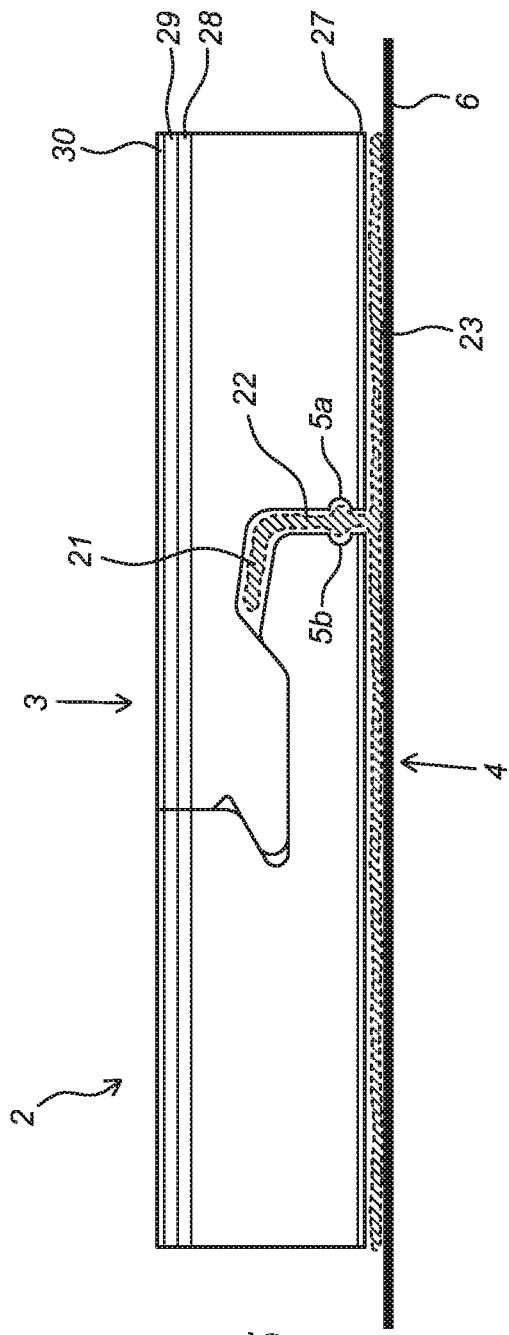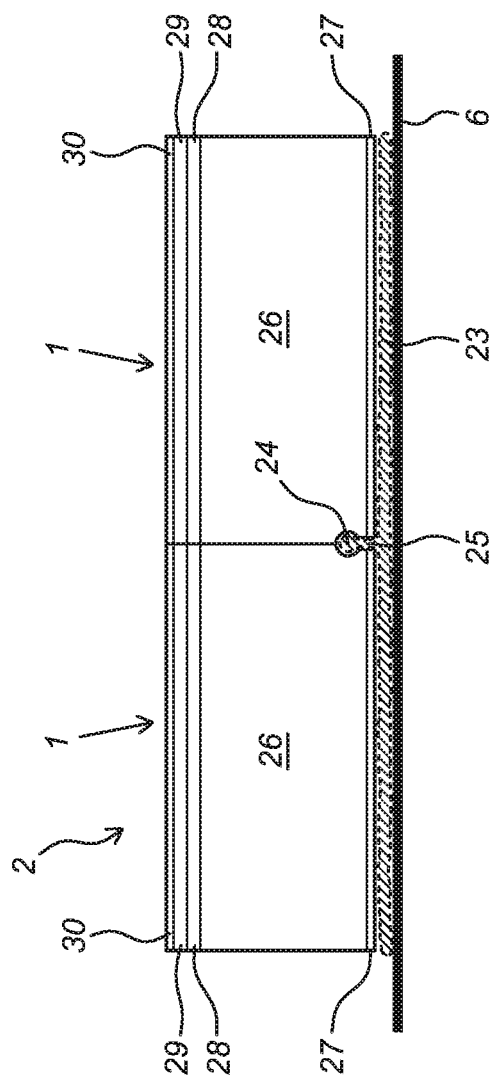

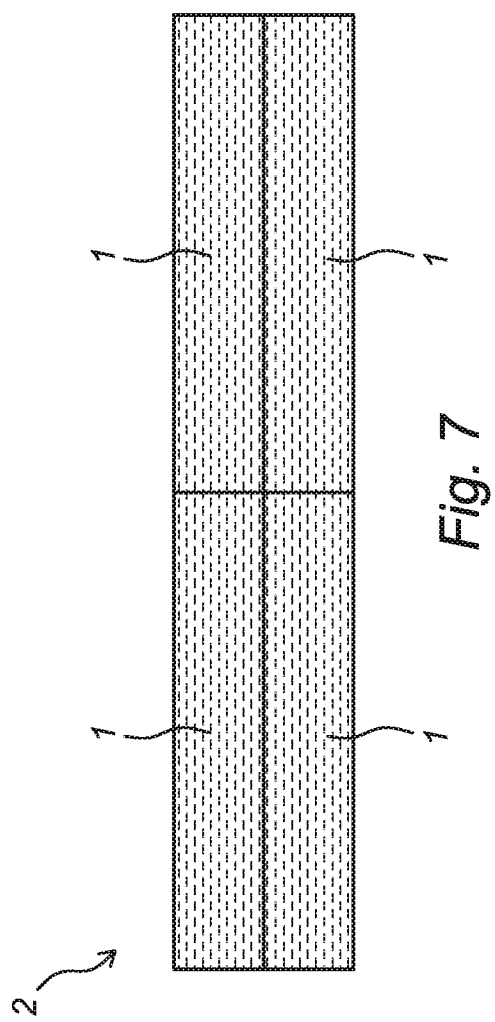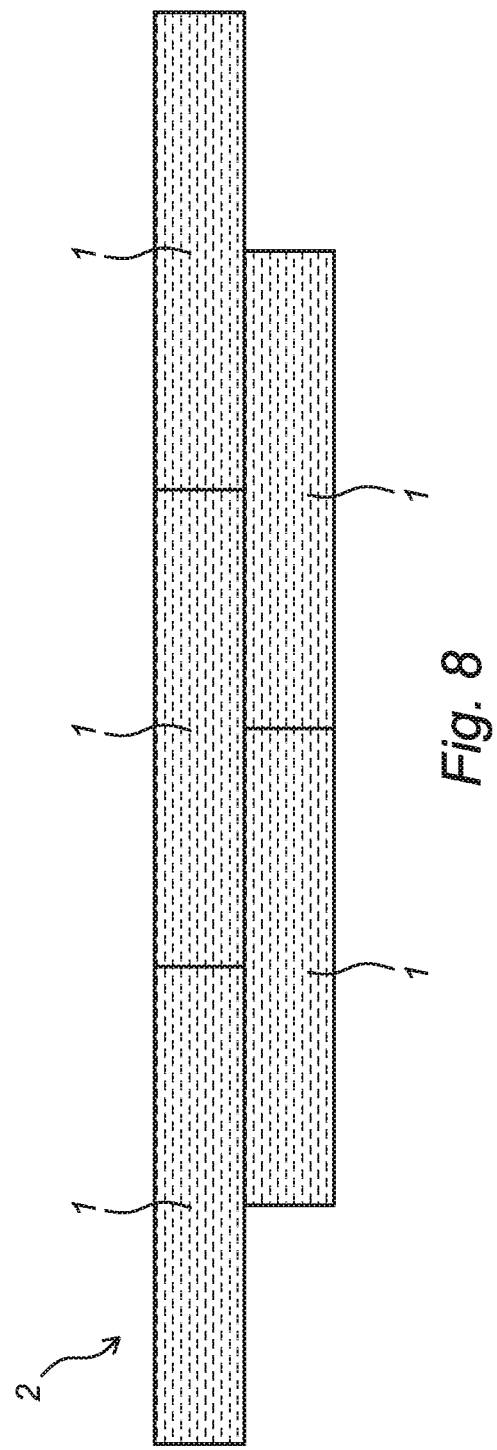

GLUE-DOWN DECORATIVE FLOOR COVERING SYSTEM

CROSS-REFERENCE TO RELATED APPLICATION

This application claims priority to The Netherlands Patent Application No. 2024630 filed Jan. 9, 2020, the disclosure of which is hereby incorporated by reference in its entirety.

BACKGROUND OF THE INVENTION

Field of the Invention

The invention relates to a glue-down decorative floor covering system. The invention also relates to a glue-down floor covering realized by interlocking a plurality of tiles of the glue-down floor covering system according to the invention. The invention further relates to a glue-down tile for use in a glue-down floor covering system according to the invention.

Description of Related Art

Developed in the 1970s, Luxury Vinyl Plank (LVP) and Luxury Vinyl Tile (LVT) were created as a means to improve upon the realism of sheet vinyl substantially composed of polyvinyl chloride (PVC). Popularity grew exponentially in 2000s as the glue-down construction emerged as a low-cost alternative to HDF/MDF laminate, hardwood and carpet. Around this time, so-called "peel & stick" versions of glue-down tiles were released as an option catering to the DIY (Do-it-Yourself) consumer. Glue-down flooring is considered a permanent type of flooring as this flooring type is physically attached to the subfloor beneath it, by means of glue or tape. Glue-down flooring can typically withstand impacts, scratches and spills. Moreover, since a glue-down floor will be physically adhered to the subfloor, it will be firmly held into place. This makes the application of a glue-down floor typically attractive to be used in rooms with heavy and frequent loads traffic. Although glue-down flooring is quite popular already for decades, the known glue-down flooring also suffers from various drawbacks. A first major drawback of the known glue-down flooring is that this flooring type is not easy to install due to the required glue to be used, which often requires a professional to install the floor in the right manner. An excessive amount of glue can for example easily foul the upper surfaces of the tiles, which is obviously undesired. Moreover, it has been found that it is not easy to properly align the tiles during installation. Another drawback of the known glue-down floors is that the glue used may degrade in the course of time, leading to a less firm connection between the tiles and the subfloor, and even to an undesired loosening of the tile from the subfloor.

It is an object of the invention to provide an improved glue-down decorative floor covering system to overcome at least one of the aforementioned drawbacks.

SUMMARY OF THE INVENTION

To this end, the invention provides glue-down decorative floor covering system according to the invention, comprising a plurality of interlockable decorative, preferably flexible, floor tiles, wherein each floor tile preferably has a thickness of less than 4.7 mm, more preferably less than 4 mm, and wherein each floor tile comprises at least one, preferably flexible, substrate layer at least partially composed of polyvinyl chloride (PVC), and wherein each floor tile is rectangular, either oblong or square, and thus comprises a first pair of opposite edges and a second pair of opposite edges; wherein the first pair of opposite edges comprise mechanical coupling parts allowing to mutually mechanically couple a plurality of such tiles to each other, wherein said coupling parts form a first locking system which effects a locking of mutually coupled tiles in the plane of the tiles and perpendicular to the respective edges, as well as form a second locking system which effects a locking of mutually coupled tiles perpendicular to the plane of the tiles, wherein these coupling parts substantially are realized from said substrate layer; wherein the coupling parts at said first pair of opposite edges are configured such that two of such tiles can be coupled to each other at these edges by means of a turning movement, and wherein the second pair of opposite edges is preferably free of any mechanical coupling parts.

The glue-down floor covering system according to the invention is still configured to be glued or adhered onto a subfloor, but wherein the tiles are provided with so-called angling down coupling parts at two opposing tile edges, typically the long tile edges, which facilitate the installation process significantly. First of all, the coupling parts make it easier to align the tiles during installation, and secondly an excess of liquid glue applied underneath the tiles to be installed and on top of the subfloor will typically be prevented to flow in between co-acting coupling parts of adjacent tiles during angling down of a tile to be installed, which considerably reduces the risk of fouling of the top surface of the tiles. As this glue-down flooring system according to the invention is relatively easy to install, a professional installer is no longer needed, and installation can be realized by a DIY user. Moreover, due to the interconnection between the coupling parts of adjacent tiles, which is preferably realized by a snap or click to realize a desired locking effect in horizontal and vertical direction, the installed glue-down floor will be more durable than known glue-down floors. Even in case of degradation of the glue, by means of which the tiles are glued to the subfloor, the co-acting between the coupling parts of adjacent tiles makes the tiles to be held in place.

The glue-down floor covering system according to the invention combines both the traditional glue-down flooring principle of attaching the floor tiles to a subfloor by means of glue, but also applies coupling parts or coupling profiles which are typically used only in floating flooring systems. The combination of both aspects lead to a new hybrid type of flooring. It is imaginable that the glue-down floor covering system can also be used to realize a wall covering, a ceiling covering, or an alternative covering, such as a furniture covering. The floor covering system according to the invention may be used either indoor or outdoor. Preferably, the floor covering system is a waterproof floor covering system. As the substrate layer is composed of PVC, typically also referred to as vinyl, the tiles of the floor covering system may also be referred to as luxury vinyl tiles (LVT) or luxury vinyl planks (LVP). Instead of PVC also other polymers, such as polypropylene, polyethylene, or polyester, polyurethane, or another thermoplastic or thermoset material may be used in the substrate layer. Also alternative materials, such as wood, composite materials, and/or mineral, such as magnesium oxide, may be used as base material to compose a substrate layer to be used in the tiles of the system according to the invention. The tiles of the floor covering system according to the invention may also be considered as planks, slabs, or panels.

As mentioned above, the coupling parts of the first pair of opposite edges are preferably designed to snap or click together during mutual coupling. This leads to a click-type locking between the tiles. Preferably, at least one coupling part of the coupling parts of the first pair of opposite edges is designed to resiliently deform during mutual coupling. This resilient deformation allows to realize a click-type locking mechanism, in particular in case the coupling parts are shaped such that during coupling of two tiles a resilient part of at least one coupling part is firstly deformed and will subsequently return at least partially to its initial shape. The coupling parts are preferably configured to co-act form-fittingly with each other.

The coupling parts are preferably complementary with respect to each other. This does however not exclude the presence of spaces (gaps) between the coupled coupling parts of adjacent tiles.

In a preferred embodiment, the coupling parts of the first pair of opposite edges comprise at a first edge a sideward tongue extending in a direction substantially parallel to the plane of the tile, the bottom front region of said sideward tongue at least partially being rounded or being flat, the bottom back region of said tongue being configured as bearing region, wherein the bottom back region is located closer to the level of the upper side of the tile than a lowest part of the bottom front region, and wherein the coupling parts of the first pair of opposite edges comprise at an opposite second edge a recess for accommodating at least a part of the sideward tongue of a further tile, said recess being defined by an upper lip and a lower lip, said lower lip being provided with a upwardly protruding shoulder for supporting the bearing region of the sideward tongue, the sideward tongue being designed such that locking takes place by an introduction movement into the recess of the sideward tongue a further tile and a angling down movement about an axis parallel to the first edge, as a result of which a top side of the sideward tongue will engage the upper lip and the bearing region of the sideward tongue will be supported by and/or facing the shoulder of the lower lip, leading to interlocking of adjacent tiles at the first and second edges. Preferably, the sideward tongue is configured to be introduced into the recess in a form-fitting manner. It is conceivable that the outer dimensioning of the sideward tongue exceeds the dimensioning of the recess. This will typically lead to an active clamping, also referred to a pretension, between the coupling parts in coupled condition. It is however also imaginable that the sideward tongue form-fittingly fits into the recess, which results in a coupling between the coupling parts without the presence of pretension in the coupled state. In coupled condition of the coupling parts, the sideward tongue and the recess preferably mutually enclose a plurality of gaps. These gaps may be present either to compensate or absorb expansion of the coupling parts, and/or may be used as glue chamber wherein glue may flow during installation in order to make the connection between adjacent tiles more firm.

Preferably, a lower surface of the bearing region, which is configured to be supported by and/or to face the shoulder of the lower lip, is upwardly inclined in the direction of the bottom front region of the sideward tongue. This will lead to a thinnest part of the sideward tongue in between the front region and the back region of the sideward tongue. This thinnest part will typically be the weakest part which is easiest to (resiliently) deform, and by positioning this weakest part close to the front region of the sideward tongue, the zone of deformation is not only predefined, but also located such that as less material of the sideward tongue as possible will be deformed during installation, which will reduce material stress built-up during installation and which will improve the lifespan of the tiles. An upper surface of the shoulder of the lower lip is preferably inclined in the direction of the upper lip. This orientation of the upper surface of the shoulder is typically favourable to create a desired space in between the shoulder and the bearing region, which space may act as upper glue chamber configured to receive glue during installation, which will further intensify the connection between the tiles.

Here, it is preferred that the distance between the upper surface of the tile and a lower surface of the bearing region, which is configured to be supported by and/or to face the shoulder of the lower lip, is smaller than the distance between the upper surface of the tile and the shoulder of the lower lip.

Preferably, the lower lip is provided with a first end surface, more preferably a substantially vertical first end surface. Preferably, the bearing region is connected to a second end surface of the tile, in particular of the substrate layer, more preferably a substantially vertical second end surface of the tile. The second end surface is located underneath (at a lower level than) the bearing region. Preferably, in coupled condition of adjacent tiles, the first end surface faces the second end surface, such that the first end surface and the second end surface mutually enclose a lower glue chamber. This lower glue chamber is preferably connected to the aforementioned upper glue chamber (if applied) and is configured to receive liquid glue during installation in order to further strengthen the connection between the tiles.

It is favourable that the first end surface and/or the second end surface is/are provided with at least one glue collecting cavity, in particular at least one glue collecting groove. This glue collecting groove(s) preferably extend(s) in a direction parallel to the coupling part and the corresponding tile edge. The application of these one or more glue collecting cavities increases the contact surface between the glue and the tile(s) which strengthen the connection between the glue and the tile(s).

Preferably, the second pair of opposite edges is not provided with any coupling parts, and these edges may be cut in a straight, preferably vertical, manner, thereby defining a third end surface and a fourth end surface, respectively. The second pair of opposite edges is typically formed by the short edges of a tile. Typically the third end surface and the fourth surface face each other in a coupled condition of adjacent tiles. Preferably, in a coupled condition of adjacent tiles, a top section of the third end surface and the fourth end surface engage to each other, preferably in a seamless manner. Preferably at least a part of a bottom section of the third end surface and the fourth end surface mutually enclose a lateral glue chamber. This glue chamber is configured to receive glue during installation which will also strengthen the connection between the tiles at this second pair of facing edges. Here, the third end surface and/or the fourth end surface may be provided with at least one glue collecting cavity, in particular at least one glue collecting groove. Despite of the fact that the second pair of opposing edges is preferably free of any mechanical coupling part, it is imaginable though that this second pair of opposing edge still comprises mechanical coupling parts allowing to mutually mechanically couple a plurality of such tiles to each other. These coupling parts may be configured to form a first locking system which effects a locking of mutually coupled tiles in the plane of the tiles and perpendicular to the respective edges, as well as form a second locking system which effects a locking of mutually coupled tiles perpendicular to the plane of the tiles, wherein these coupling parts substantially are realized from said substrate layer. The coupling parts at said second pair of opposite edges may be configured such that two of such tiles can be coupled to each other at these edges by means of a turning movement and/or a vertical movement. In this case, for example, locking between the tiles takes place During angling down of a tile to be coupled at the first edge to the second edge of a further already installed tile, wherein the fourth edge of said tile to be coupled makes a scissoring movement toward the third edge of yet another already installed tile. Here it is conceivable that the third edge comprises a single upward tongue, at least one upward flank lying at a distance from the upward tongue and a single upward groove formed between the upward tongue and the upward flank, wherein a at least a part of a side of the upward tongue facing toward the upward flank is inclined and extends in the direction of the normal of the upper side of the core, and wherein at least a part of a side of the upward tongue facing away from the upward flank may comprise a first locking element, and that the fourth edge comprises a single downward tongue, at least one downward flank lying at a distance from the downward tongue, and a single downward groove formed between the downward tongue and the downward flank, wherein at least a part of a side of the downward tongue facing toward the downward flank is inclined and extends in the direction of the normal of the lower side of the core, and wherein the downward flank may comprise a second locking element adapted for co-action with the first locking element of the third edge of yet a further tile. Preferably, during coupling the downward tongue of the fourth edge of the tile to be coupled will be forced into the upward groove of the third edge of said other tile and the upward tongue of said other tile will be forced into the downward groove of the tile the be coupled, by deformation of the third edge and/or the fourth edge, leading to locking of adjacent tiles at the third and fourth edges in both horizontal direction and vertical direction.

The tile of the flooring covering system according to the invention typically comprises at least one balancing layer affixed, either directly or indirectly, to a lower surface of the substrate layer. This balancing layer is intended to keep the tile as flat as possible. The balancing layer is typically formed by a PVC based film. The balancing layer may act as sound dampening layer. Preferably, each tile comprises at least one decorative layer affixed, either directly or indirectly, to an upper surface of the substrate layer. The decorative layer may be a printed layer, and/or may be covered by at least one protective (top) layer covering said decorative layer. The presence of a print layer and/or a protective layer could prevent the tile to be damaged by scratching and/or due to environmental factors such as UV/moisture and/or wear and tear. The print layer may be formed by a film onto which a decorative print is applied, wherein the film is affixed onto the substrate layer and/or an intermediate layer, such as a primer layer, situated in between the substrate layer and the decorative layer. The print layer may also be formed by at least one ink layer which is directly applied onto a top surface of the substrate layer, or onto a primer layer applied onto the substrate layer. Each tile may comprise at least one wear layer affixed, either directly or indirectly, to an upper surface of the decorative layer. Each tile may comprise at least one lacquer layer affixed, either directly or indirectly, to an upper surface of the decorative layer, preferably to an upper surface of the wear layer.

The tiles of the glue-down floor covering system according to the invention may have any thickness, typically ranging from 2 to 12 mm, but preferably have a limited thickness of less than 4.7 mm, more preferably less than 4 mm, such as 2.5 mm (or less), 2.8 mm (or less), 3.0 mm (or less), 3.5 (or less) or 3.8 mm (or less), which is more typical for glue-down floor tiles. The tiles of the glue-down floor covering system according to the invention are preferably flexible. To this end, it is advantages in case the PVC of the substrate layer is provided with plasticizer, typically in an amount of between 0 and 20% by weight. It is not excluded though that the substrate layer is semi-rigid or rigid and/or that each tile as such is semi-rigid or rigid. The substrate layer may be foamed, but for glue-down tiles it is more common to apply a solid substrate layer. The substrate layer preferably comprises at least one inert filler, such as calcium carbonate (chalk) or talc or a mixture of various fillers, wherein the amount of filler(s) is preferably between 20 and 70 weight % by weight.

It is imaginable that the bottom surface (rear side) of each tile is provided with an adhesive allowing the tile to be adhered to the subfloor. This may be any suitable adhesive and/or a pressure-sensitive adhesive, which becomes adhesive when said pressure-sensitive adhesive is subjected to mechanical pressure. In this manner, the application of separate glue to attach the tiles to a subfloor may be omitted. Optionally, the adhesive is initially covered by a peelable cover, which leads to a peel and stick type of glue-down floor covering.

The invention also relates to a glue-down floor covering realized by interlocking a plurality of tiles of the glue-down floor covering system according to the invention.

The invention further relates to a tile for use in a glue-down floor covering system according to the invention.

The ordinal numbers used in this document, like "first", "second", and "third" are used only for identification purposes. By "complementary" coupling parts or coupling profiles is meant that these coupling parts can cooperate with each other. However, to this end, the complementary coupling parts do not necessarily have to have complementary forms. In this document, the directional expression "horizontal" should be understood as being parallel to or falling together with a plane defined by the tile(s), and the direction expression "vertical" should be understood as perpendicular to the plane of the tile(s). Hence, by locking in "vertical direction" is meant locking in a direction perpendicular to the plane of the tile. By locking in "horizontal direction" is meant locking in a direction perpendicular to the respective coupled edges of two tiles and parallel to or falling together with the plane defined by the tiles.

BRIEF DESCRIPTION OF THE DRAWINGS

The invention will be elucidated on the basis of non-limitative exemplary embodiments shown in the following figures, wherein.

DESCRIPTION OF THE INVENTION

Figure 1:
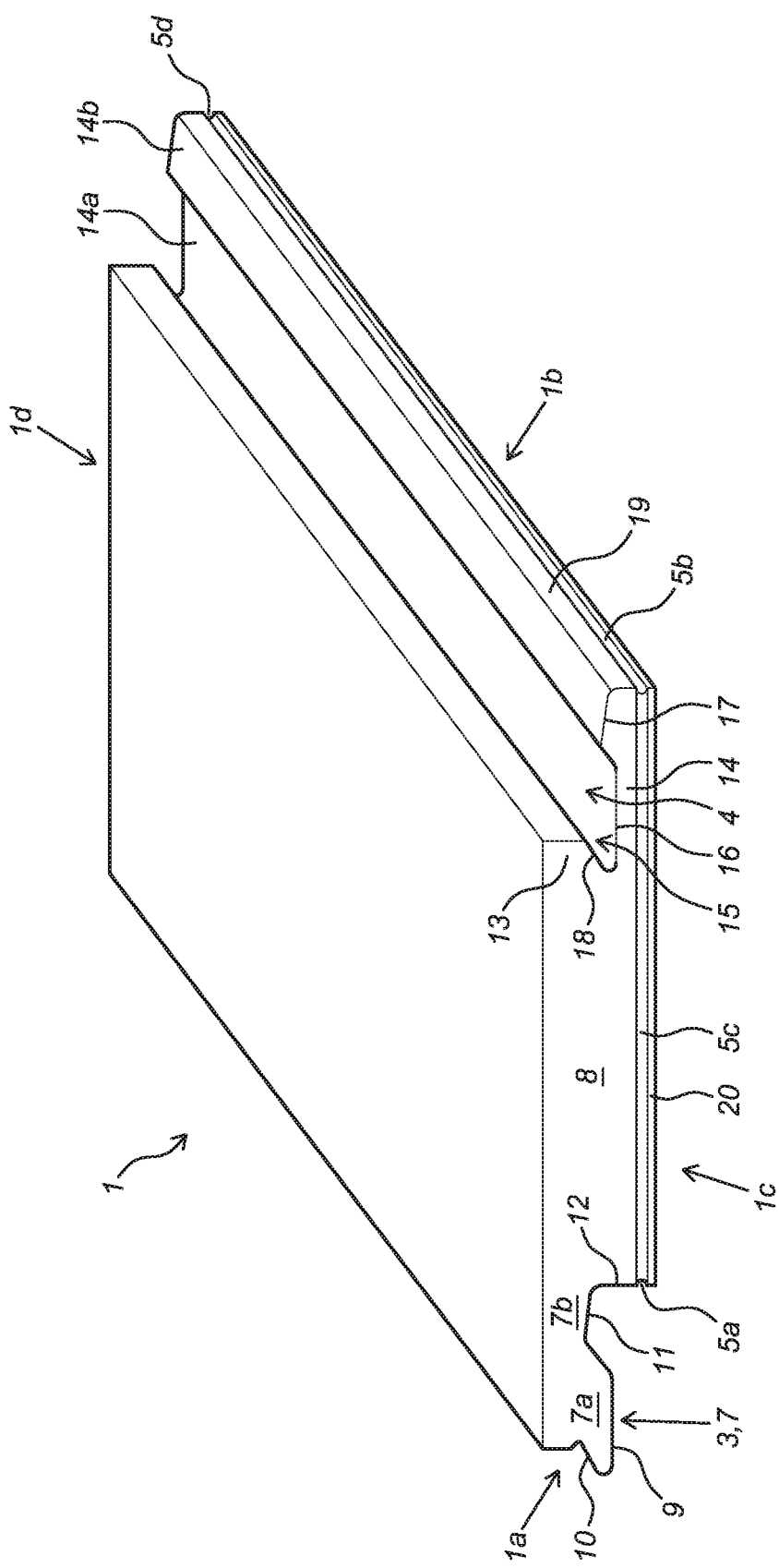
FIG. 1 shows a perspective view of a glue-down tile of a glue-down floor covering system according to the invention, FIG. 2 a lateral cross-section of the tile according to FIG. 1, FIG. 3 a longitudinal cross-section of the tile according to FIG. 1, FIG. 4 a glue-down floor covering consisting of a plurality of interlocked glue-down tiles according to FIG. 1, FIG. 5 a detailed view of a part A of the floor covering according to FIG. 4, FIG. 6 a cross-section according to line B-B of the floor covering according to FIG. 4, FIG. 7 a top view of a glue-down floor covering consisting of a plurality of interlocked glue-down tiles according to FIG. 1 installed according to a first installation pattern, and FIG. 8 a top view of a glue-down floor covering consisting of a plurality of interlocked glue-down tiles according to FIG. 1 installed according to a second installation pattern.
Figure 2:
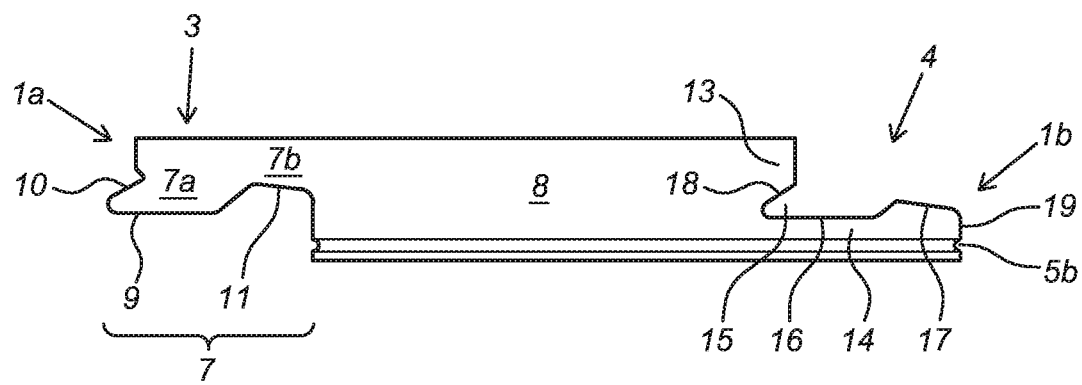
Figure 3:
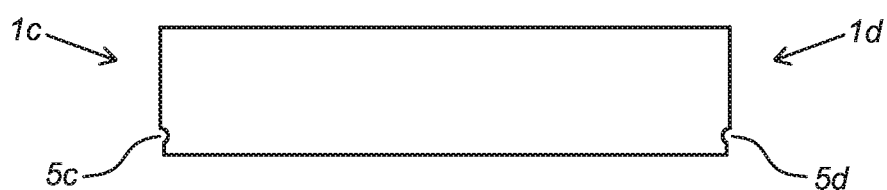
Figure 4:
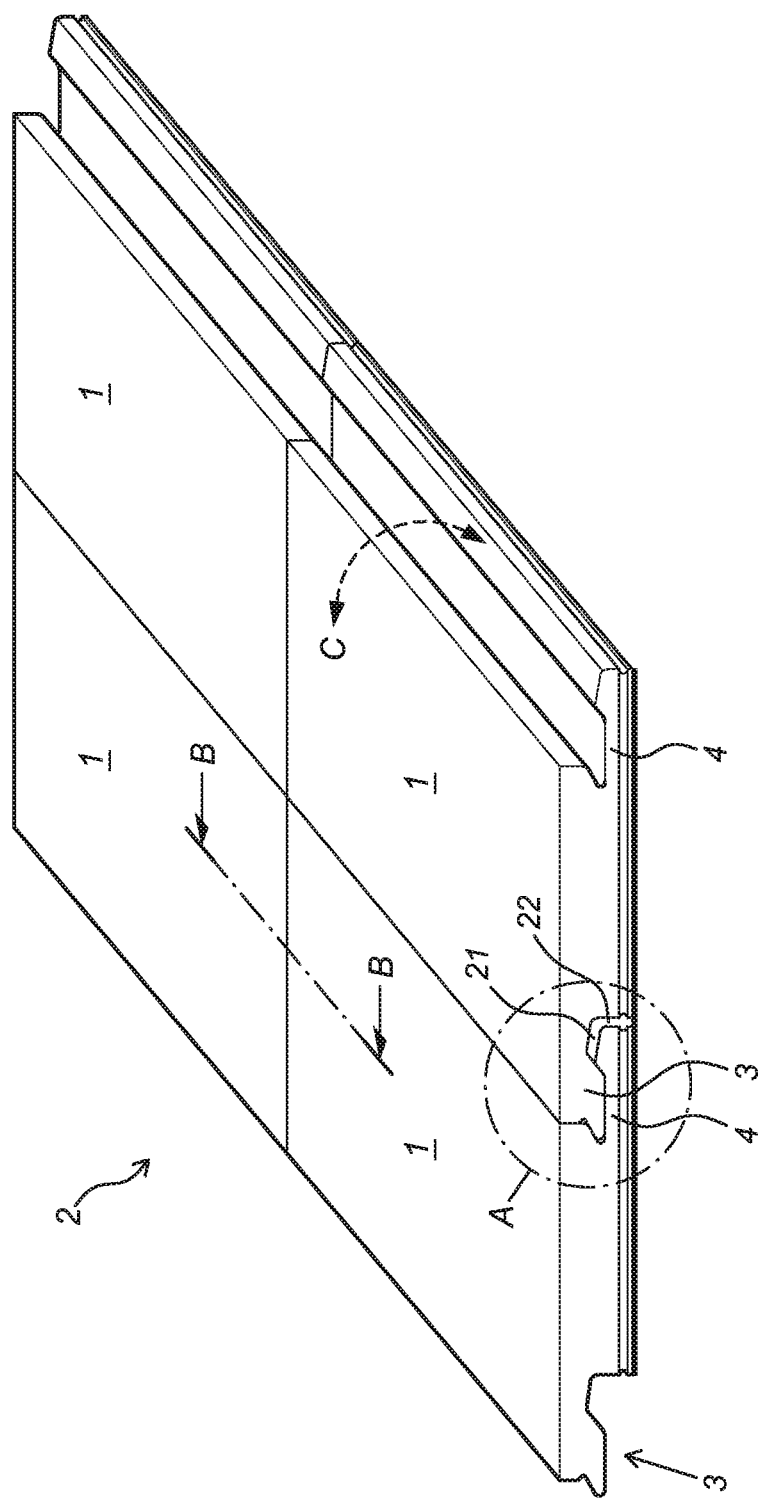

FIG. 1 shows a perspective view of a rectangular glue-down tile 1 of a glue-down floor covering system 2 (see FIGS. 4-8) according to the invention, FIG. 2 shows a lateral cross-section of the tile according to FIG. 1, and FIG. 3 a longitudinal cross-section of the tile according to FIG. 1. The tile 1 is mechanically interconnectable with two similar tiles for forming said covering 2. The tile 1 comprises a first pair of opposing long edges 1a, 1b, identified as the first edge 1a and the second edge 1b, and second pair of opposing short edges 1c, 1d, identified as the third edge 1c and the fourth edge 1d. The first pair of opposing edges 1a, 1b comprises complementary mechanical coupling parts 3, 4, identified as the male coupling part 3, and the female coupling part 4 to allow the tile 1 to be mechanically coupled with two other tiles 1. The second pair of opposing edges 1c, 1d is free of any mechanical coupling parts, which makes the tile 1 suitable to be mechanically coupled to two tiles only. Each edge 1a, 1b, 1c, 1d is provided with a longitudinal groove 5a, 5b, 5c, 5d extending in a direction parallel to the corresponding edge. Grooves 5a, 5b, 5c, 5d of adjacent edges 1a, 1b, 1c, 1d are mutually connect and together form a circumferential groove 5. The circumferential groove 5 is intended to receive glue during gluing down of the tile 1 onto a subfloor 6 to intensify the connection between the tile 1 and the subfloor 6 and between the tile 1 and adjacent tiles. The male coupling part 3 comprises a sideward tongue 7 which is integrally connected to a central body 8 of the tile 1. A front region 7a of the sideward tongue 7 is provided with a flat bottom surface 9. An outer end (a tip) of the front region 7a of the sideward tongue 7 is provided at an upper side with an inclined locking surface 10. A back region 7b of the sideward tongue 7 is situated in between the front region 7a and the central body and connects the front region 7a to the central body 8. An lower side of the back region 7b could be identified as a bearing surface 11. This bearing surface 11 is inclined in the direction of the front region 7a of the sideward tongue 7. The bearing surface 11 connects to a substantially vertical first end surface 12 of the central body 8. The female coupling part 4 comprises an upper lip 13 and a lower lip 14 defining a recess 15. Both lips 13, 14 are integrally connected to the central body 8. As shown in FIG. 1, the width of the upper lip 13 is substantially smaller than the width of the lower lip 14. The recess 15 has a shape which is complementary to the shape of the sideward tongue 7. More in particular, a top surface 16 of a back region 14a of the lower lip 14 has a (complementary) flat shape, configured to co-act with the flat bottom surface of the front region 7a of the sideward tongue 7, while a front region 14b of the lower lip 14 is provided with a upwardly protruding shoulder 17, configured to face the bearing surface 11 of the sideward tongue 7 of another tile, at a distance from said bearing surface 11. The space created this way, in coupled condition, is defined as upper glue chamber 21. A lower surface 18 of the upper lip 13 is inclined and corresponds to the locking surface 10 of the sideward tongue 7. A substantially vertical distal end surface 19 of the lower lip 14 is connected to a lower surface 20 of the tile 1, and in coupled condition with another tile, will face the end surface 12 of the central body 8, and will be positioned at a distance from said end surface 12 of the central body 8. The space created this way, in coupled condition, is defined as lower glue chamber 22, which is connected to the upper glue chamber 21 as visualized in more detail in FIGS. 4 and 5. In FIGS. 4-8 a floor covering system according to the invention is shown, and more in particular a floor covering realized by said floor covering system, wherein a plurality of tiles 1 are interconnected, and wherein the tiles 1 are glued down to the subfloor 6 by using solidified glue 23. As shown in FIG. 5, the glue has flown (and solidified) in the upper and lower glue chambers 21, 22. As shown in FIG. 6, the groove 5c of the third edge 1c and the groove 5d of the fourth edge 1d are facing each other and together form a (small) further glue chamber 24. To allow glue 23 to flow into this glue chamber 24 during installation, a glue inlet 25 is created at the bottom in between the tiles 1. This glue inlet 25 is actually formed by cut-away portions of the bottom parts of the third edge 1c and the fourth edge 1d. The top sections of the outer surfaces of the third edge 1c and the fourth edge 1d are typically positioned against each other, wherein (uncoupled, loose) direct contact is present between these top sections. Optionally, during installation a thin film of glue may flow in between these top sections. The aforementioned further glue chamber 24 formed in between the grooves 5c and 5d contributes to further stabilization of the floor covering once the glue has been solidified. As shown by arrow C in FIG. 4, two tiles 1 can be mechanically connected by angling down (turning down) a tile 1 be coupled while the male coupling part 3 of the tile 1 is inserted into the female coupling 4 of an already installed tile 1. During this angling down movement, wherein the coupling parts 3, 4 co-act with each other, the tile 1 to be installed will automatically be installed and aligned in a proper manner, while prevent that glue will flow in between the coupling parts 3, 4 up to the top surfaces of the tiles 1 (which would foul the tiles 1). During this angling down movement at least coupling parts 3, 4 will have to be deformed temporarily in order to be able to insert the sideward tongue 7 into the complementary recess 15. In the installed state, the coupling parts 3, 4 will normally return to their initial shape to the complementary shapes of both coupling parts 3, 4. This temporary deformation of one of more coupling parts 3, 4 will lead to a click-type or snap-type connection, whereas the male coupling part 3 will have to be clicked or snapped into the female coupling part 4. This interconnection will lead to locking of two tiles 1 in both horizontal direction and vertical direction. As shown in FIGS. 5 and 6, the tiles 1 have a layered structure, wherein a substrate layer 26 (core layer) is normally the thickest layer and comprises PVC, plasticizer, and preferably at least one filler. The plasticizer soften the PVC which typically provides the tile 1 as such a flexible character. A backing layer 27, also referred to as balancing layer is affixed to a lower side of the substrate layer 26, and typically has the function to balance the tile 1 as such. On top of the substrate layer 26 successively a decorative printed layer 28, a wear layer 29, and a UV hardened lacquer layer 30 are applied. The thickness of this panel is preferably between 2.8 and 4.7 mm. As shown in FIGS. 4 and 7 the rectangular tiles 1 can be installed in a horizontal grid, but as shown in FIG. 8 it is also imaginable to install the tiles for example in an offset or staggered brickwork pattern.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

The invention claimed is:

1. A glue-down decorative floor covering system, comprising a plurality of interlockable decorative flexible floor tiles,
   wherein each floor tile has a thickness of less than 4.7 mm,
   wherein each floor tile comprises at least one flexible substrate layer comprising polyvinyl chloride (PVC),
   wherein each floor tile is rectangular, either oblong or square, and thus comprises a first pair of opposite edges and a second pair of opposite edges,
   wherein the first pair of opposite edges comprise mechanical coupling parts allowing to mutually mechanically couple a plurality of such tiles to each other,
   wherein the coupling parts form a first locking system, the first locking system being configured to effect a locking of mutually coupled tiles in a plane of the tiles and perpendicular to the respective edges, as well as form a second locking system, the second locking system being configured to effect a locking of mutually coupled tiles perpendicular to the plane of the tiles,
   wherein the coupling parts substantially are realized from the substrate layer,
   wherein the coupling parts at the first pair of opposite edges are configured such that two of such tiles can be coupled to each other at the first pair of opposite edges by a turning movement, and
   wherein the coupling parts of mutually coupled tiles define at least one glue chamber therebetween, the at least one glue chamber being configured to receive glue therein at a bottom of the mutually coupled tiles.

2. The floor covering system according to claim 1, wherein the coupling parts of the first pair of opposite edges are designed to snap or click together during mutual coupling.

3. The floor covering system according to claim 1, wherein during mutual coupling of the coupling parts at least one coupling part is forced to deform.

4. The floor covering system according to claim 1, wherein the coupling parts are configured to co-act form-fittingly with each other.

5. The floor covering system according to claim 1, wherein the coupling parts of the first pair of opposite edges comprise at a first edge a sideward tongue extending in a direction substantially parallel to the plane of the tile, a bottom front region of the sideward tongue being at least partially rounded, a bottom back region of the tongue being configured as bearing region,
   wherein the bottom back region is located closer to a level of an upper side of the tile than a lowest part of the bottom front region,
   wherein the coupling parts of the first pair of opposite edges comprise at an opposite second edge a recess for accommodating at least a part of the sideward tongue of a further tile, the recess being defined by an upper lip and a lower lip, the lower lip being provided with a upwardly protruding shoulder for supporting the bearing region of the sideward tongue, the sideward tongue being designed such that locking takes place by an introduction movement into the recess of the sideward tongue of the further tile and an angling down movement about an axis parallel to the first edge, and
   wherein, as a result of the introduction movement and the angling down movement, a top side of the sideward tongue will engage the upper lip and the bearing region of the sideward tongue will be supported by or facing the upwardly protruding shoulder of the lower lip, leading to interlocking of adjacent tiles at the first and second edges.

6. The floor covering system according to claim 5, wherein the sideward tongue is configured to be introduced into the recess in a form-fitting manner.

7. The floor covering system according to claim 5, wherein an outer dimensioning of the sideward tongue exceeds a dimensioning of the recess.

8. The floor covering system according to claim 5, wherein, in a coupled condition of the coupling parts, the sideward tongue and the recess mutually enclose a plurality of gaps.

9. The floor covering system according to claim 5, wherein a lower surface of the bearing region is configured to be supported by or to face the upwardly protruding shoulder of the lower lip and upwardly inclined in the direction of the bottom front region of the sideward tongue.

10. The floor covering system according to claim 5, wherein an upper surface of the upwardly protruding shoulder of the lower lip is upwardly inclined in the direction of the upper lip.

11. The floor covering system according to claim 5, wherein a distance between the upper surface of the tile and a lower surface of the bearing region, the lower surface of the bearing region being configured to be supported by or to face the upwardly protruding shoulder of the lower lip, is smaller than a distance between the upper surface of the tile and the upwardly protruding shoulder of the lower lip.

12. The floor covering system according to claim 5, wherein the at least one glue chamber comprises an upper glue chamber, and
    wherein, in a coupled condition of adjacent tiles, the bearing region and the upwardly protruding shoulder of the lower lip mutually enclose the upper glue chamber.

13. The floor covering system according to claim 5, wherein the lower lip is provided with a substantially vertical first end surface.

14. The floor covering system according to claim 5, wherein the bearing region is connected to a substantially vertical second end surface of the tile.

15. The floor covering system according to claim 14, wherein the at least one glue chamber comprises a lower glue chamber, and
    wherein, in a coupled condition of adjacent tiles, the first end surface faces the second end surface, such that the first end surface and the second end surface mutually enclose the lower glue chamber.

16. The floor covering system according to claim 14, wherein at least one of the first end surface and the second end surface are provided with at least one glue collecting cavity.

17. The floor covering system according to claim 15, wherein the upper glue chamber is connected to the lower glue chamber.

18. The floor covering system according to claim 1, wherein the second pair of opposite edges consists of a third edge and an opposite fourth edge, wherein the third edge is provided with a substantially vertical third end surface and wherein the fourth edge is provided with a substantially vertical fourth end surface.

19. The floor covering system according to claim 18, wherein, in a coupled condition of adjacent tiles, the third end surface faces the fourth end surface, such that a top section of the third end surface and the fourth end surface engage to each other, and such that at least a part of a bottom section of the third end surface and the fourth end surface mutually enclose a lateral glue chamber.

20. The floor covering system according to claim 18, wherein at least one of the third end surface and the fourth end surface is/are provided with at least one glue collecting cavity, in particular at least one glue collecting groove.

21. The floor covering system according to claim 1, wherein the upper side of the tile is adapted to engage substantially seamless to the upper side of another tile.

22. The floor covering system according to claim 1, wherein each tile comprises at least one balancing layer affixed, either directly or indirectly, to a lower surface of the substrate layer.

23. The floor covering system according to claim 1, wherein each tile comprises at least one decorative layer affixed, either directly or indirectly, to an upper surface of the substrate layer.

24. The floor covering system according to claim 23, wherein the decorative layer is a printed layer.

25. The floor covering system according to claim 23, wherein each tile comprises at least one wear layer affixed, either directly or indirectly, to an upper surface of the decorative layer.

26. The floor covering system according to claim 23, wherein each tile comprises at least one lacquer layer affixed, either directly or indirectly, to an upper surface of the decorative layer.

27. The floor covering system according to claim 1, wherein a bottom surface of each tile is provided with an adhesive allowing the tile to be adhered to the subfloor.

28. The floor covering system according to claim 1, wherein the adhesive is initially covered by a peelable cover.

29. The floor covering system according to claim 1, wherein the second pair of opposite edges comprise mechanical coupling parts allowing to mutually mechanically couple a plurality of such tiles to each other, wherein the coupling parts form a first locking system which effects a locking of mutually coupled tiles in the plane of the tiles and perpendicular to the respective edges, as well as form a second locking system which effects a locking of mutually coupled tiles perpendicular to the plane of the tiles, wherein these coupling parts substantially are realized from the substrate layer.

30. The floor covering system according to claim 29, wherein the coupling parts at the second pair of opposite edges are configured such that two of such tiles can be coupled to each other at the second pair of opposite edges by a turning movement.

31. The floor covering system according to claim 29 wherein the coupling parts at the second pair of opposite edges are configured such that two of such tiles can be coupled to each other at the second pair of opposite edges by a vertical movement.

32. A glue-down floor covering realized by interlocking a plurality of tiles of the glue-down floor covering system according to claim 1.

* * * * *